(12) United States Patent
Frank et al.

(10) Patent No.: US 11,107,501 B2
(45) Date of Patent: Aug. 31, 2021

(54) ENCRYPTED DATA KEY IN MEDIUM AUXILIARY MEMORY

(71) Applicants: Joseph T Frank, Boulder, CO (US); David Lee Trachy, Longmont, CO (US)

(72) Inventors: Joseph T Frank, Boulder, CO (US); David Lee Trachy, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 116 days.

(21) Appl. No.: 16/189,338

(22) Filed: Nov. 13, 2018

(65) Prior Publication Data

US 2020/0152235 A1 May 14, 2020

(51) Int. Cl.
*H04L 29/00* (2006.01)
*G11B 20/00* (2006.01)
*G11B 23/04* (2006.01)
*G06F 12/14* (2006.01)
*G06F 21/62* (2013.01)

(52) U.S. Cl.
CPC .... *G11B 20/00224* (2013.01); *G06F 12/1408* (2013.01); *G06F 21/6218* (2013.01); *G11B 20/00115* (2013.01); *G11B 23/042* (2013.01)

(58) Field of Classification Search
CPC . G11B 2220/90; G11B 2220/652; G11B 5/86; G11B 27/36; G11B 20/1201; G11B 20/00224; G11B 20/00115; G11B 23/042; G06F 12/1408; G06F 21/6218
See application file for complete search history.

(56) References Cited

U.S. PATENT DOCUMENTS

| 5,592,550 | A | 1/1997 | Davis et al. |
| 5,900,888 | A | 5/1999 | Kurosawa |
| 6,425,042 | B1 | 7/2002 | Ikeda et al. |
| 7,421,691 | B1 | 9/2008 | Hancock et al. |
| 8,255,705 | B2 | 8/2012 | Starr et al. |
| 2008/0273696 | A1* | 11/2008 | Greco .................. G06F 21/80 380/44 |
| 2009/0049310 | A1* | 2/2009 | Carlson .............. G06F 3/0619 713/193 |
| 2009/0049311 | A1* | 2/2009 | Carlson .............. G06F 3/0686 713/193 |
| 2010/0031054 | A1* | 2/2010 | Starr ................ G06F 21/6218 713/189 |

* cited by examiner

*Primary Examiner* — Ghazal B Shehni
(74) *Attorney, Agent, or Firm* — Kenneth Altshuler (57) ABSTRACT

A method for securing user data that is stored to a tape cartridge having a medium auxiliary memory (MAM) is described. When user data is sent to a tape library from a client, the tape library sends a request to a cloud based key management service for a data key to encrypt the user data and an encrypted data key that corresponds to the data key. The data key is used to encrypt the user data which is then stored to the tape cartridge and the encrypted data key is stored to the MAM. Upon decrypting the encrypted user data, the encrypted data key is extracted from the MAM and sent to the cloud based key management service where it is used to produce the data key from the cloud based key management service which is then sent to the tape library. When the tape library is in possession of the data key, the encrypted data in the tape cartridge can then be decrypted and sent to a requester of the user data.

20 Claims, 7 Drawing Sheets

PRIOR ART

FIG. 1A

PRIOR ART

ENCRYPTED DATA KEY IN MEDIUM AUXILIARY MEMORY

CROSS-REFERENCE TO RELATED APPLICATIONS

None.

BACKGROUND OF THE INVENTION

1. Field of the Invention

The present invention relates generally to tape cartridges containing medium auxiliary memory devices wherein an encrypted data key can be maintained with a corresponding data key maintained in a public cloud.

2. Description of Related Art

The data storage industry continues with a remarkable expansion in storage needs fueled in part by aggressive cost reduction of data storage due to advances in storage technology, broadened international accessibility to the internet and the World Wide Web and the public's appetite to accumulate data. Unfortunately, data attacks and data theft targeting data storage libraries and servers are on the rise as evidenced from high profile data breaches from the medical industry to political databases effecting election outcomes.

Figure 1A:
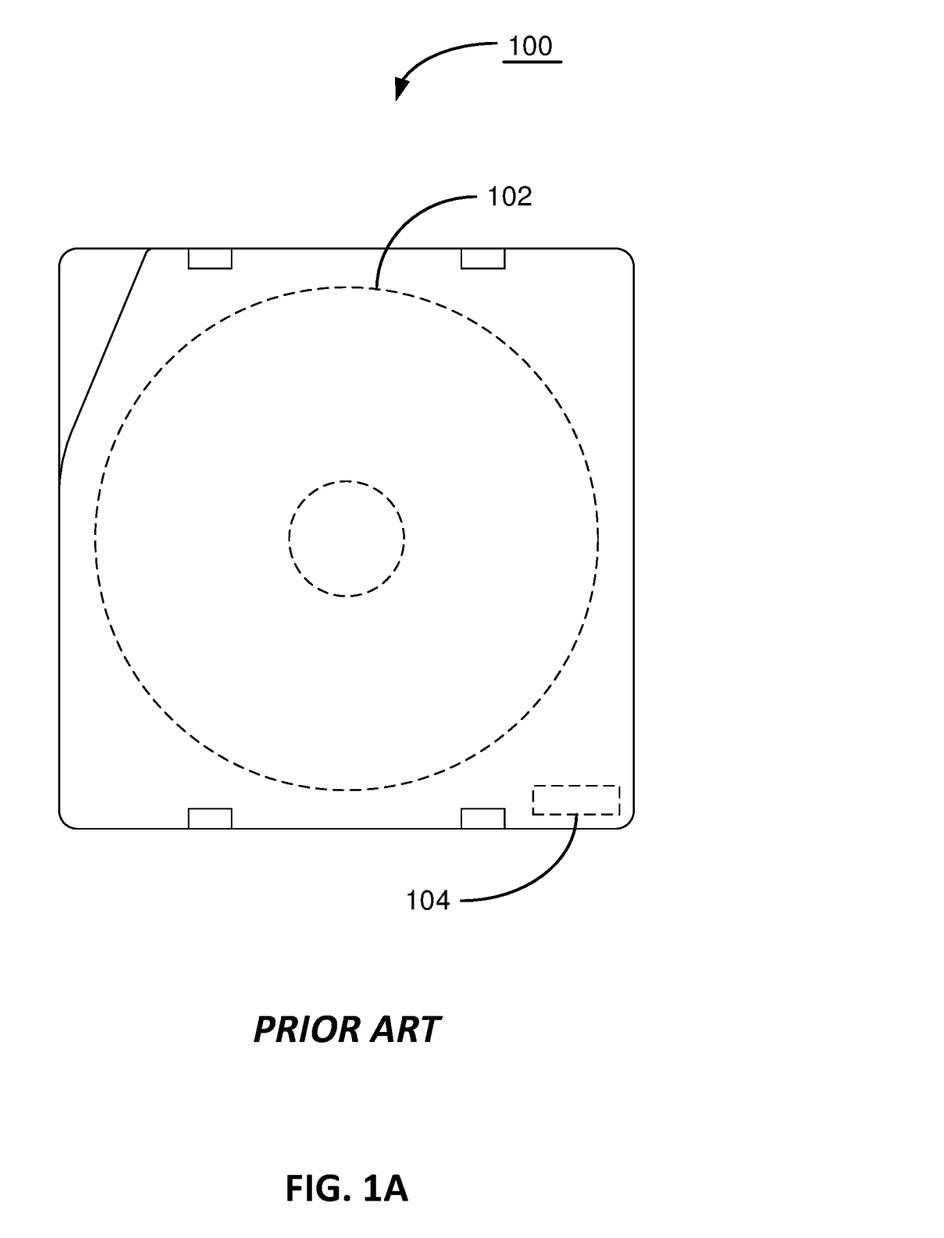
FIG. 1A is a prior art pictorial representation of a tape cartridge with an auxiliary radio frequency memory device.

Data storage libraries serve as data receptacles for a variety of clients including businesses, governments and the general population. These libraries are generally comprised of tape drives adapted to read and write user data to and from tape cartridges which can be archived within outside of the libraries. FIG. 1A shows an example of a contemporary tape cartridge 150 currently being used in many of the mainstream storage libraries. As illustratively shown, the tape cartridge 100 generally comprises tape medium 102 and in some cases, a Medium Auxiliary Memory (MAM) 104, shown here in dashed lines because the MAM 104 and tape medium 102 reside in the interior of the cartridge 100.

Figure 1B:
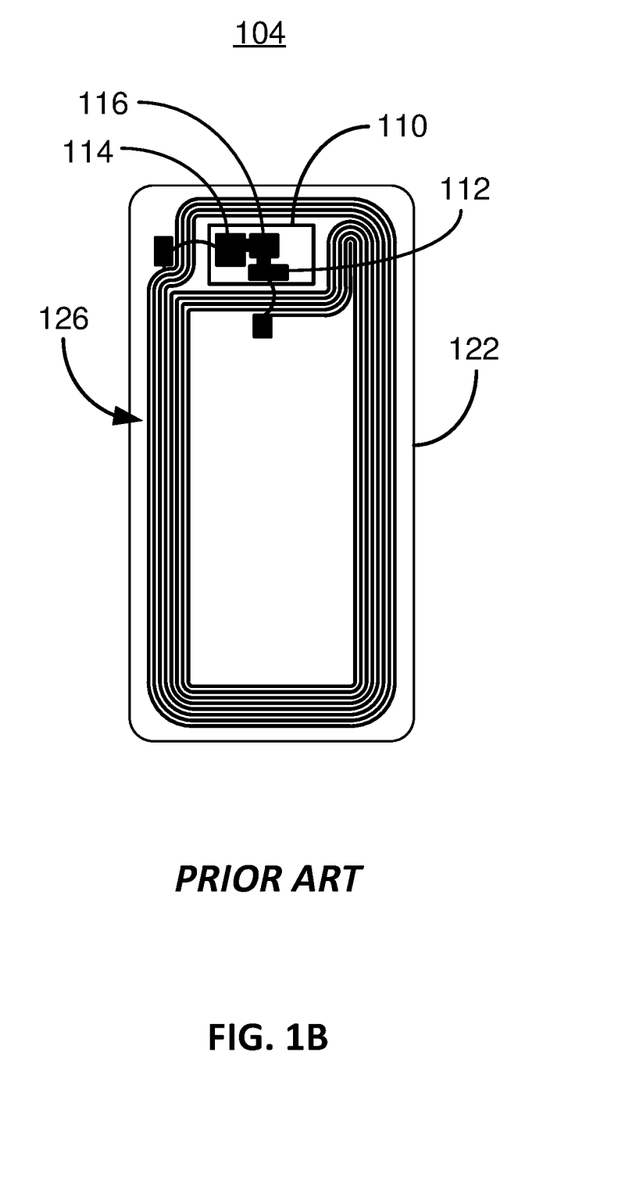
FIG. 1B is a prior art pictorial representation of an auxiliary radio frequency memory device.

The MAM 104, as shown in FIG. 1B, fundamentally comprises an integrated circuit 110 that includes solid state memory 112, a microprocessor 114 (used as the engine of the MAM 104) and a transceiver 116. The integrated circuit 110 is attached to an antenna 126, the antenna 126 is typically a small coil of wires. The MAM 104 is considered a passive device because it is energized when subjected to a strong enough RF field produced by a MAM-reader/transceiver. Because the RF field attenuates the further away the MAM 104 is from the RF source, the MAM 104 must be within range from the RF source where the RF field is strong enough, this is referred to as the interrogation zone. More specifically, the interrogation zone is defined by the region in which the MAM 104 can actively communicate with the RF source. Information, such as tape cartridge serial number and load count, can be transmitted between the MAM 104 and the MAM-reader via a specific radio frequency. MAMs 104 can cut data access time down to a fraction from historical techniques which require reading key parameter information directly from the tape medium 102.

A MAM allows the tape drive to access valuable cartridge data without the use of a physical connection, reducing connector wear for both the drive and the media. The MAM comprises a memory chip built into the data cartridge that provides a direct and immediate connection to the drive's on-board processors, which speeds access to information related to the data cartridge such as system logs, for example. Information and file search parameters are formatted within the MAM system thereby effectively cutting the data access time down to a fraction from historical techniques.

With continued reference to FIG. 1A, one advantage of a tape cartridge 100 is mobility providing archive ability in remote locations called "vaults" making an "on-line" data attack difficult, if not impossible. However, should an attacker acquire a tape cartridge, the data stored on the tape medium 102 or the associated MAM 104 may be subject to unwanted access. In attempts to prevent unwanted access, a tape cartridge, or other mobile media capable of being used in a data storage library, can be armed with a number of security measures including data encryption. One fundamental component of data encryption is knowledge of how to decode or decrypt the data; such knowledge is known to those skilled in the art as the key. Therefore, it is of the utmost importance to prevent the key from falling into the hands of someone attempting to access the encrypted data without authorization.

It is to innovations related to improving managing encrypted data on tape cartridges or other mobile media that the subject matter disclosed herein is generally directed.

SUMMARY OF THE INVENTION

The present invention generally relates to a tape cartridge containing a medium auxiliary memory device with an encrypted data key stored thereto whereby the encrypted data key can be used to locate a data key in an independent centralized or otherwise cloud server to decrypt encrypted user data stored to a tape cartridge.

One embodiment of the present invention can therefore comprise a medium auxiliary memory (MAM) comprising: a nonvolatile non-transient solid state memory device; an antenna; a MAM transceiver; a microprocessor; and an encrypted data key that uniquely corresponds to a data key retained in a server that is remote to the MAM, the encrypted data key retained in the nonvolatile non-transient solid state memory device, the data key only capable of being obtained when the encrypted data key is provided to the server and decrypted by the server.

Another embodiment of the present invention can therefore comprise a method of decrypting user data using a MAM, the method comprising: providing a storage element with the MAM physically linked to the storage element, the MAM comprising a non-transient solid state memory device, an antenna, a MAM transceiver, and a microprocessor, the storage element is mobile; communicatively linking an external transceiver with the MAM via the antenna, the MAM transceiver and the microprocessor, the external transceiver comprised by a local computing system; obtaining via the external transceiver an encrypted data key from the non-transient solid state memory device; connecting the local computing system to a remote server; sending the encrypted data key to the remote server; requesting a data key that uniquely corresponds to the encrypted data key, the data key resides in the remote server and not in the local computing system; and receiving at the local computing system the data key from the remote server after the sending step.

Yet another embodiment of the present invention can therefore comprise a tape cartridge comprising: a medium auxiliary memory (MAM) physically connected to the tape cartridge, the MAM comprising a non-transient memory device, an antenna, a MAM transceiver, a microprocessor and an encrypted data key stored in the non-transient memory device, the tape cartridge comprising a tape recording medium possessing encrypted data, the encrypted data only capable of being decrypted by a data key located in a public cloud computing system, the tape cartridge adapted to be loaded in a tape drive, the encrypted data read from the tape cartridge by the tape drive is adapted to be decrypted by a decryption engine when using the data key, the data key adapted to be provided to the decryption engine only after receiving the encrypted data key from the MAM.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of maintaining data keys. In what follows, similar or identical structures may be identified using identical callouts.

Because securing data through encryption by maintaining local or private data keys in a local/private or dedicated hardened server is extremely expensive (due to independently owning and maintaining the hardened server/s and related hardware), one embodiment of the present invention aims to solve this problem by maintaining private data keys in the cloud. More specifically, significant cost savings can be realized for data stored to tape cartridges that contain encrypted user data by having a public cloud service provide a data key that is uniquely used to encrypt and decrypt the user data. The scheme envisions an encrypted version of the data key (encrypted data key) being maintained with the encrypted user data in the tape cartridge with the ability to retrieve the data key from the cloud when the encrypted data key is provided to the cloud. Without the encrypted data key, the actual data key cannot be retrieved by the public cloud service. Generating and otherwise singularly being able to provide a data key via the public cloud costs pennies and is orders of magnitude less expensive than maintaining in a local/private dedicated hardened server (traditionally accomplished via a key and moniker system).

Along these lines, certain embodiments contemplate a method for securing user data that is stored to a tape cartridge having a medium auxiliary memory (MAM). When user data is sent to a tape library from a client, the tape library sends a request to a cloud based key management service for a data key to encrypt the user data and an encrypted data key that corresponds to the data key. The data key is used to encrypt the user data which is then stored to the tape cartridge and the encrypted data key is stored to the MAM. Upon decrypting the encrypted user data, the encrypted data key is extracted from the MAM and sent to the cloud based key management service where it is used to produce the data key from the cloud based key management service which is then sent to the tape library. When the tape library is in possession of the data key, the encrypted data in the tape cartridge can then be decrypted and sent to a requester of the user data.

Figure 2:
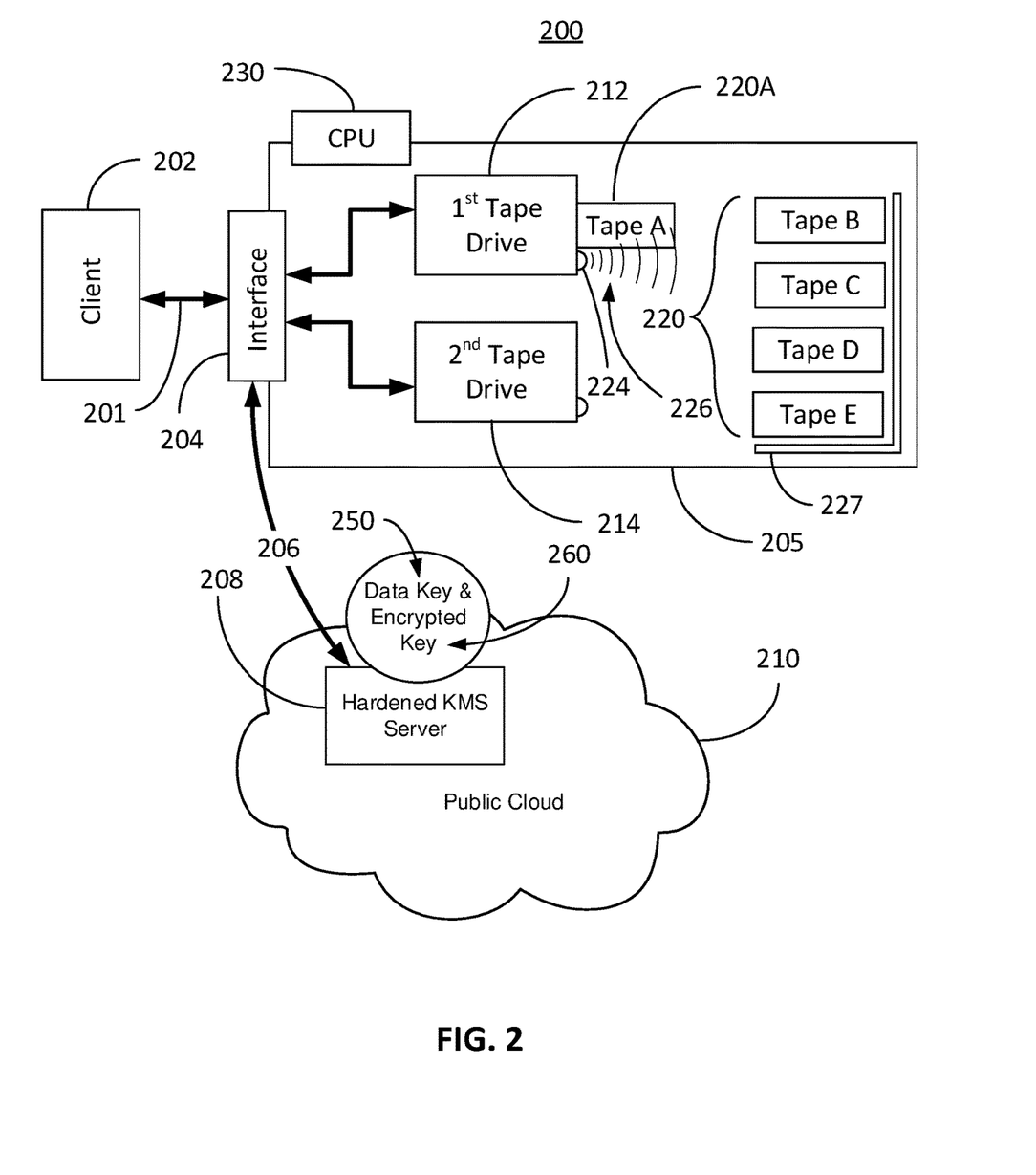
FIG. 2 is a block diagram of a data storage arrangement constructed in accordance with an embodiment of the present invention.

Referring to the drawings in general, and more specifically to FIG. 2, shown therein is a block diagram of a data storage arrangement constructed in accordance with an embodiment of the present invention. The data storage arrangement 200 can comprise a client 202 in communication with a data storage library 200 via a communication link 201. The communication path 201, at a minimum, needs only to facilitate communication between the client 202 and the storage library 205. The communication link 201, or means for communication, can be accomplished by a LAN, WAN, or other communication architecture via wireline, whether dedicated or otherwise, such as a SCSI [Small Computer Systems Interface] cabled connection, fibre-channel, Ethernet and the like, or wireless technology, such as satellite, Wi-Fi, Bluetooth, infrared, etc. or combination thereof known by those skilled in the art. The client 202 can be a personal computer, a main frame computer, a server, or any computer system operatively linked to the storage library 100, to name a few examples. The client 202 is an entity, or entities, that is capable of "taking in" data, for example a client 202 is a consumer when receiving data and a storage library 205 is a consumer when receiving data. As one skilled in the art will appreciate, in addition to "taking in" data, a consumer of data is also generally capable of manipulating and/or transmitting data.

The illustrative library 205 comprises an interface 204 capable of facilitating compatible communication or otherwise compatible data traffic between at least a first tape drive 212 and/or a second tape drive 214 and the client 202. In one example, the client 202 may be in communication 201 with the library 205 via fibre-channel using a fibre-channel protocol; however, the tape drives 212 and 214 may be configured to communicate via a SCSI-channel using a SCSI protocol. In some embodiments, the interface 204 is adapted to transfer data packages, or data chunks, to either the first tape drive 212 that is cooperatively linked (i.e., loaded) with tape cartridge 'A' 220A and/or the second tape drive 214 when cooperatively linked with another tape cartridge 220. A data package is considered a discrete article of data, such as for example a file, a group of data files, data blocks, data segments, etc., that are received in a substantially contiguous time interval, data that is connected to a particular data set or data that is of a predetermined size, to name several examples. The library 205 also comprises a plurality of tape cartridges (tapes C-E) 220 capable of storing user data. The tape cartridges 220 can be disposed in a shelf system 227 within the tape library 205. As one skilled in the art will recognize, a tape cartridge 220, can be moved within or outside of the library 200 and can be used with other compatible tape drives.

The tape library 205 possesses a central processing unit (CPU) 230 that essentially provides the necessary computing and controlling functions within the tape library 205 by way of a computer area network, or CAN (not shown). It is known by those skilled in the art that the processing functions can also be done via other processors within the tape library 205, such as by way of the interface 204 or the tape drives 212/214, or multiple processing units within the tape library 205. For example, the CPU 230 and/or the interface 204 can comprise an encryption engine capable of encrypting data packets received by the client 202, however tape drives 212/214 are often equipped with encryption engines thereby encrypting data coming in while storing to a tape cartridge 220. An encryption engine can include software programs used with a processor, or alternatively, an integrated circuit chip comprising encryption capability, to name two non-limiting examples. An encryption engine need only be capable of altering data from plain text, or in some cases data "as received" from the client 202. Encrypting is a well-known technology whereby a unique encryption key (also known as a "data key") is used to encrypt data. It is common security practice for the data key to be stored in a location away from the encrypted data. When the data that has been encrypted is recalled, the data key must be provided to decrypt the data. In simple terms, a data key is used to decipher, or bring back the data to the "as received" state. An "as received" state could be in a form other than plain text, such as a data package previously encrypted or a data package compressed by the client 202, for example.

Certain embodiments envision a data key accessible from or potentially located in an external location that is away or otherwise independent from any encrypted data while an encrypted key that is linked to the data key is retained locally. The encrypted key can be used to obtain the data key from the external location.

Figure 3:
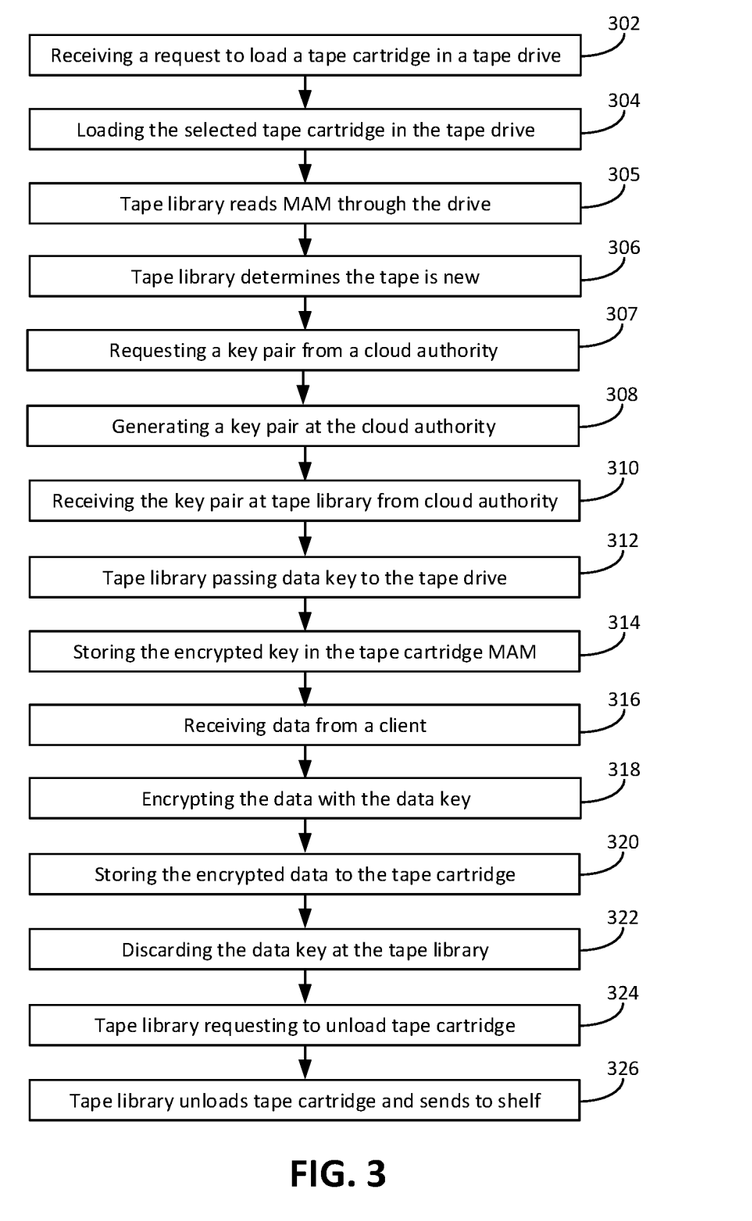
FIG. 3 illustratively shows a block diagram of method steps to protect user data by way of encryption using a data key generated and managed/controlled by an external location and an encrypted data key retained locally consistent with embodiments of the present invention.

FIG. 3 illustratively shows a block diagram of method steps to protect user data by way of encryption using a data key generated and managed/controlled by an external location and an encrypted data key retained locally consistent with embodiments of the present invention. The steps of FIG. 3 are illustratively described in view of FIG. 2 via a suitable commercial environment (AWS) in which certain embodiments of the present invention can be practiced. The method for managing encryption can comprise providing one or more tape cartridges 220 disposed in a tape library 205. As shown, the tape library 205 provides a shelf system 227 for the tape cartridges 'B' through 'E' 220 disposed in a robotic tape library 205. Generally speaking, tape cartridges 'B'-'E' 220 are moved between the shelf system 227 to a tape drive 212/214 and loaded via a picker (not shown) in an available or otherwise selected tape drive 212/214. The term "loading" a tape cartridge 220 in a tape drive 212/214 means that a tape cartridge 220 is inserted through an opening in the tape drive (not shown) after which the tape media 102 in the tape cartridge 220 is threaded in the tape drive 212/214 in a way that is in contact or near contact with a cooperating read/write head (not shown). When a tape cartridge 220 is loaded in a tape drive 212/214, the tape cartridge 220 forms a cooperating read/write relationship with the tape drive 212/214 whereby data (whether user data, metadata, format data, or some other kind of data) can be written to or read from the tape cartridge 220 via the tape drive 212/214.

As shown in step 302, a request is received by the client 202 to load a selected, or otherwise available, tape cartridge 220 (illustratively shown is Tape-A 220A) in a selected, or otherwise available, tape drive 212/214 (illustratively shown as $1^{st}$ Tape Drive 212) in anticipation of receiving user data. In response, the selected tape cartridge Tape-A 220A is loaded into the $1^{st}$ Tape Drive 212, step 304. In the present embodiment, each tape drive 212 and 214 comprises a radiofrequency transceiver (RF transmitter/transceiver) 224 (or in some embodiments a transceiver) that can wirelessly communicate via a communication link 226 with a tape cartridge MAM 104. Certain other embodiments contemplate an RF transceiver being located elsewhere within the tape library 205 or even outside of the tape library 205 so long as the RF transceiver can form a communication link with the MAM 104. Once loaded, the tape library 205 reads the MAM 104 through the $1^{st}$ Tape Drive 212, step 305, and determines that the selected tape cartridge Tape-A 220A is new or otherwise devoid of data and available to store new user data therein, step 306. Assuming that the user data is intended to be encrypted, the tape library 205 connects to a cloud authority 210 to obtain a data key and encrypted data key pair, step 307. A commercial example of a cloud authority is Amazon Web Services, or AWS 210, provided by Amazon Corporation of Seattle, Wash. AWS 210 provides hundreds of services, such as face recognition services, processing services, database and storage services in addition to Key Management Services (KMS) 208. KMS 208 generates data keys and maintains access to those data keys for customers in hardened servers. Server hardening is the process of enhancing server security through a variety of means which results in a much more secure server operating environment. AWS KMS 208 basically has encryption built into the system so that people cannot break into their hardened servers and steal the data keys. One embodiment envisions that when a data key is requested, an algorithm that uses a plurality of factors (such as, time of day, location, client's identity, access key and a secret key, and/or bunch of other factors and/or access keys and the like) generates a key pair comprised of both a data key 250 and an associated encrypted data key 260 (or just "encrypted key"), steps 308. The data key 250 and the encrypted key 260 are associated in that they are uniquely paired (i.e., correspond) with one another. Though certain embodiments contemplate that the encrypted key 260 is the encrypted form of the data key 250 (such as by way of hashing the data key or other by using techniques known to those skilled in the art to encrypt the data key 250), generating the encrypted key 260 could be handled elsewhere. In this embodiment the encrypted key is not retained in AWS 210, rather the ability to generate the data key 250 is solely accomplished by AWS 210, however other embodiments envision that both the encrypted key 260 and access to the data key 250 reside solely in AWS 210. Though the above example directs attention to AWS 210 as the receptacle for production of the data key 250, certain embodiments envision the data key 250 or generation of the data key being located in a generic server that is remote to at least the Tape-A 220A if not the tape library 205.

With continued reference to FIG. 3, both the data key 250 and the encrypted data key 260 are transferred from AWS 210 to the tape library 205 via an Internet connection 206 (or other data transfer means consistent within the scope and spirit of the present invention), step 310. In the present embodiment, the encrypted data key 260 is wirelessly transmitted 226, or otherwise passed to and retained by the MAM 104 via the RF transceiver 224, step 312. More specifically, the MAM memory 112 (which in certain embodiments is a nonvolatile non-transient solid state memory device) provides sufficient storage capacity to retain the encrypted data key 260. Certain embodiments contemplate that the encrypted data key 260 is simply retained in the tape media 102, which is a viable solution for tape cartridges that do not comprise a medium auxiliary memory. A MAM 104 provides advantages in storing the encrypted data key 260 and that the encrypted data key 260 can be readily obtained by interrogating the MAM 104 when it is within the interrogation zone of the RF transceiver 224 (i.e., when there is sufficient RF power to activate the passive MAM circuit 104/antenna 126). When in the interrogation zone, the MAM 104 is energized to make functional the microprocessor 114 which controls the functions and communication of the MAM 104 with the interrogator/external transceiver 224. With that said, the encrypted key 260 is stored to the MAM 104 in selected tape cartridge Tape-A 220A, step 314.

With the data key 250 in possession of the tape library 205, data from the client 202 is received, step 316, and then encrypted via the data key 250, step 318, and then transferred to the 1$^{st}$ Tape Drive 212 where the encrypted data is stored to Tape-A 220A, step 320. Following the data being transferred to Tape-A 220A, the data key 250 is discarded from the tape library 205, step 322. Standard recognized security protocol dictates that the data key 250 is not allowed to "persist" on a disk drive, flash drive, tape cartridge or other kind of nonvolatile memory in the tape library 205. Accordingly, if the data key 250 were allowed to persist, i.e., be retained by the tape library 205 or somehow with the encrypted data, and someone were to break into a tape library 205, the data would not be secure. In some embodiments, the data key 250 only exists in volatile memory such that when power is taken away from the volatile memory, the data key 250 disappears. Hence, at this point in this embodiment, the encrypted key 260 is retained in the MAM comprised by Tape-A 220A and the data key 250 is held solely in security in AWS KMS 208. In the present embodiment, the tape library 205 has neither the data key 250 nor the encrypted key 260. Once all of this is done, the tape library makes a request to the 1$^{st}$ tape drive 212 to unload Tape-A 220A (step 324) and send Tape-A 220A to the shelf system 227 for long term data retention (step 326). It should be recognized that it is not required to perform the steps associated with FIG. 3 as ordered above.

Figure 4A:
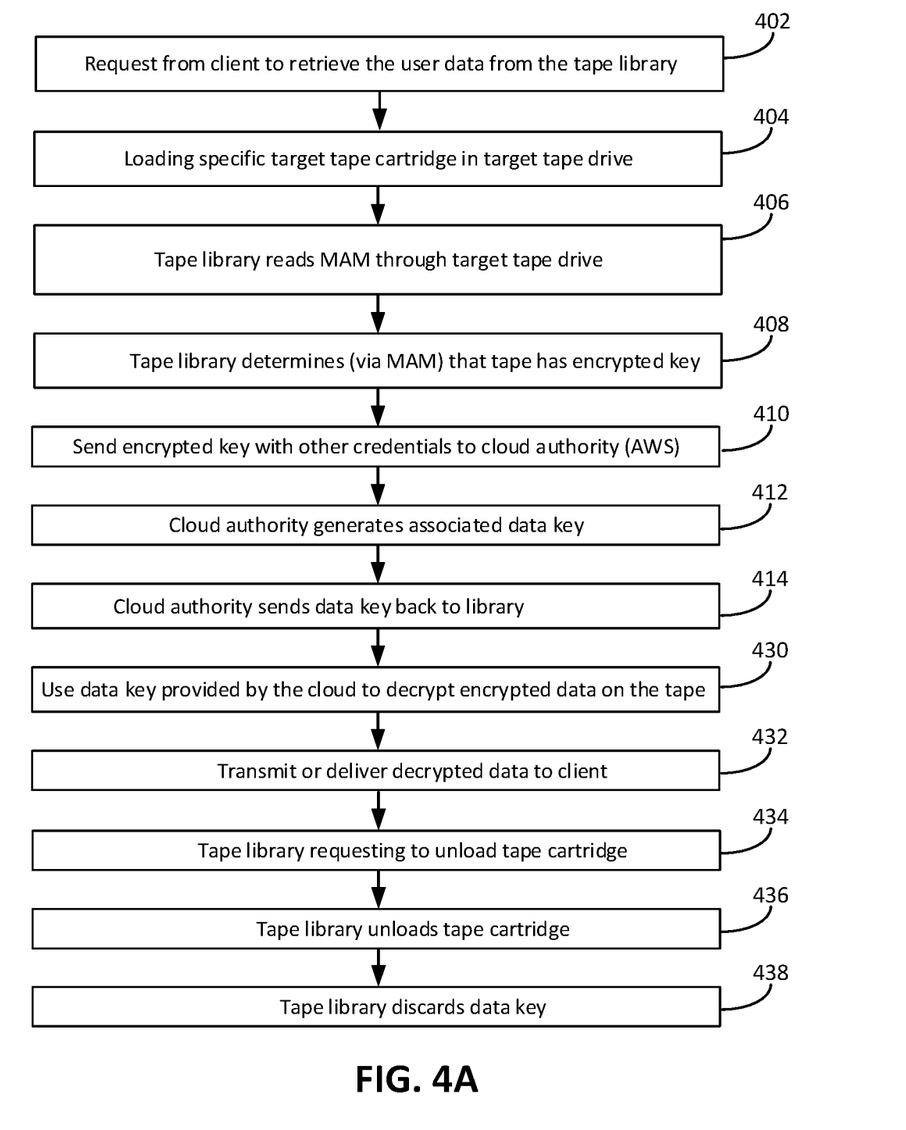
FIG. 4A illustratively shows a block diagram of method steps to retrieve protected user data that is encrypted by way of a data key provided from an external location and an encrypted data key retained locally consistent with embodiments of the present invention.

FIG. 4A illustratively shows a block diagram of method steps to retrieve protected user data that is encrypted by way of a data key provided from an external location and an encrypted data key retained locally consistent with embodiments of the present invention. The steps of FIG. 4 are illustratively described in view of FIG. 2 via AWS KMS 208 (a suitable commercial environment) in which certain embodiments of the present invention can be practiced. Continuing on from the method of FIG. 3, the user data received from the client 202 is safely encrypted and retained in Tape-A 220A. Tape-A 220A can either be located within the tape library 205, a different tape library, or in a long-term storage vault located away from the tape library 205, to name three examples. In step 402 either the client 202 or some other user of data with the appropriate authorization makes a request to the tape library 205 to retrieve the user data. Certain embodiments envision that the client 202 has knowledge of Tape-A 220A and where Tape-A 220A is located while other embodiments envision that the client 202 only knows that the user data is retained at an address that happens to be the tape library 205. Either way, Tape-A 220A is located and brought to and loaded in a compatible tape drive, which in this case is the P$^t$ tape drive 212, step 404.

Tape-A 220A is scanned by the RF transceiver 224 whereby the RF transceiver interrogates the MAM 104 in Tape-A 220A and reads or otherwise obtains the information in the MAM 104, step 406. The tape library 205 not only determines that Tape-A 220A is encrypted via the integrated MAM 104, the encrypted data key 260 is obtained, step 408. The encrypted data key 260 is sent from the tape library 205 (also typically along with credentials that can include a string of digits making up an Access Key and a Secret Key) to the cloud authority, AWS 210, to obtain the data key 250, step 410. Certain embodiments envision that without the encrypted data key 260, AWS 210 will be unable to provide the data key 250 and the encrypted data will be irretrievable. In other words, AWS 210 must have the encrypted data key 260 in order to generate and verify the data key 250. Certain embodiments contemplate that the data key 250 is only capable of being obtained when the encrypted data key 260 is provided to AWS 210 along with all necessary credentials. In this embodiment, AWS 210 decrypts the encrypted data key when the credentials are used. Further security measures include validating the decrypted data key by comparing a decrypted master key that is embedded/included with the encrypted data key 260 with a master key retained by AWS 210. No matter the complexity involved in generating a valid data key 250 from the encrypted data key 260 (step 412), once done the generated data key 250 is sent back to the tape library 205, step 414. With possession of the data key 250, the library can use the data key 250 to decrypt the encrypted data on Tape-A 220A, step 430. This can be accomplished by applying the data key 250 against the encrypted user data via an encryption engine (not shown), which is typically (though not necessarily) comprised by a tape drive 212. An encryption engine can be an integrated circuit chip or a software program/routine running on a microprocessor in the library 205 or a tape drive 212 in the library 205. Once the user data has been decrypted, or optionally while the user data is being decrypted, the decrypted user data is transmitted to the client 202 or other authorized entity requesting the user data, step 432. Once the decrypted data is sent (such as to the client 202), the tape library 205 requests to unload Tape-A 220A from the 1$^{st}$ tape drive 212, step 434, whereby Tape-A 220A is unloaded from the P$^t$ tape drive 212, step 436. Given the operations are completed, the tape library 205 discards the data key 250, step 438.

Figure 4B:
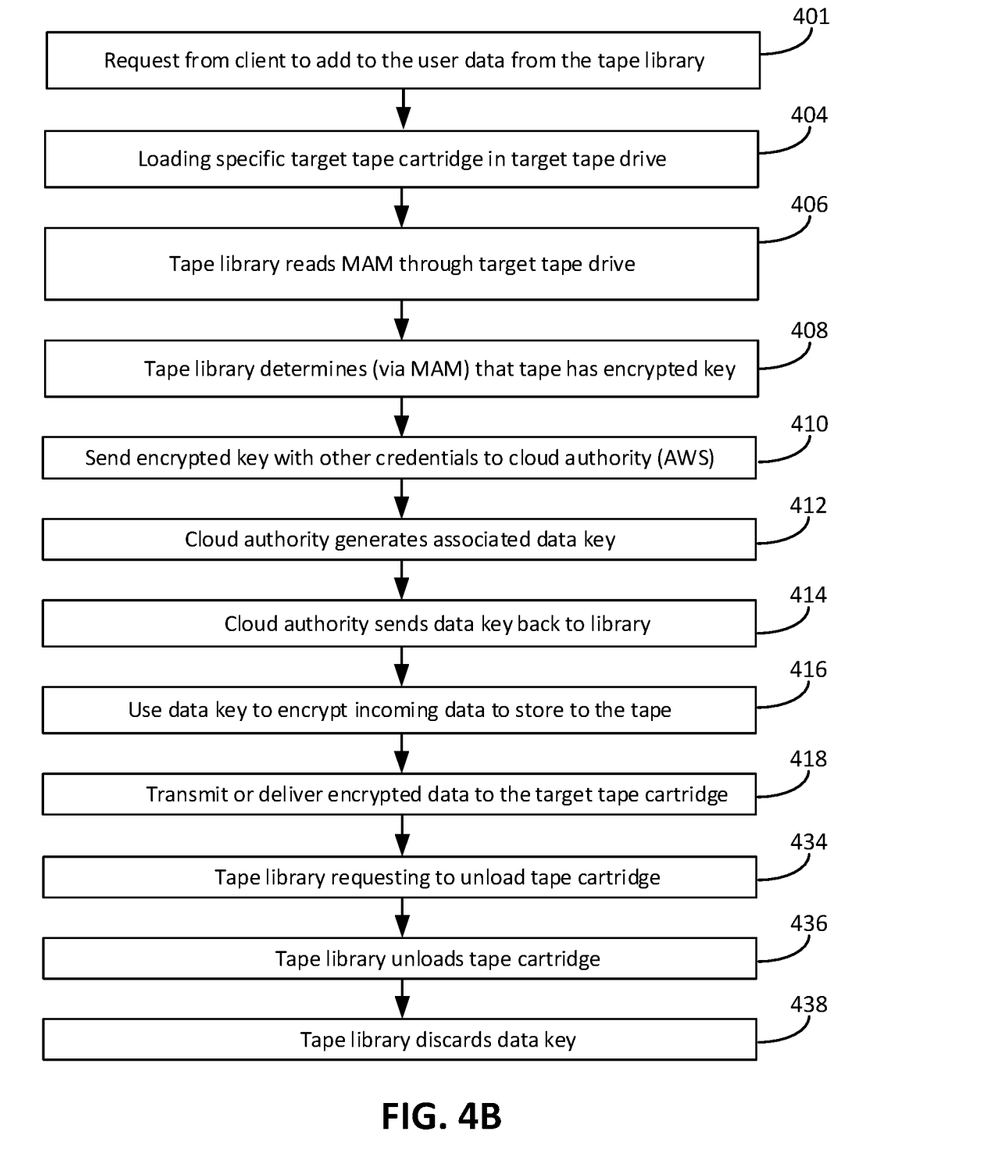
FIG. 4B illustratively shows a block diagram of another method embodiment to add to protected user data that is encrypted by way of the data key provided from the external location consistent with embodiments of the present invention.

FIG. 4B illustratively shows a block diagram of another method embodiment to add to protected user data that is encrypted by way of the data key provided from the external location consistent with embodiments of the present invention. Step 401 is substituted for step 402 in that instead of a request to retrieve data, there is a request to add more user data to the tape cartridge, which in this example is Tape-A 220A. After obtaining the data key 250 from the cloud authority 210 (steps 404-414), the data key 250 is used by the encryption engine (not shown) to encrypt this incoming data (from the client 202, for example), step 416. The encrypted data is then delivered to Tape-A 220A where it is stored sequentially following the previously stored data. Steps 434-438 are described above.

Figure 5:
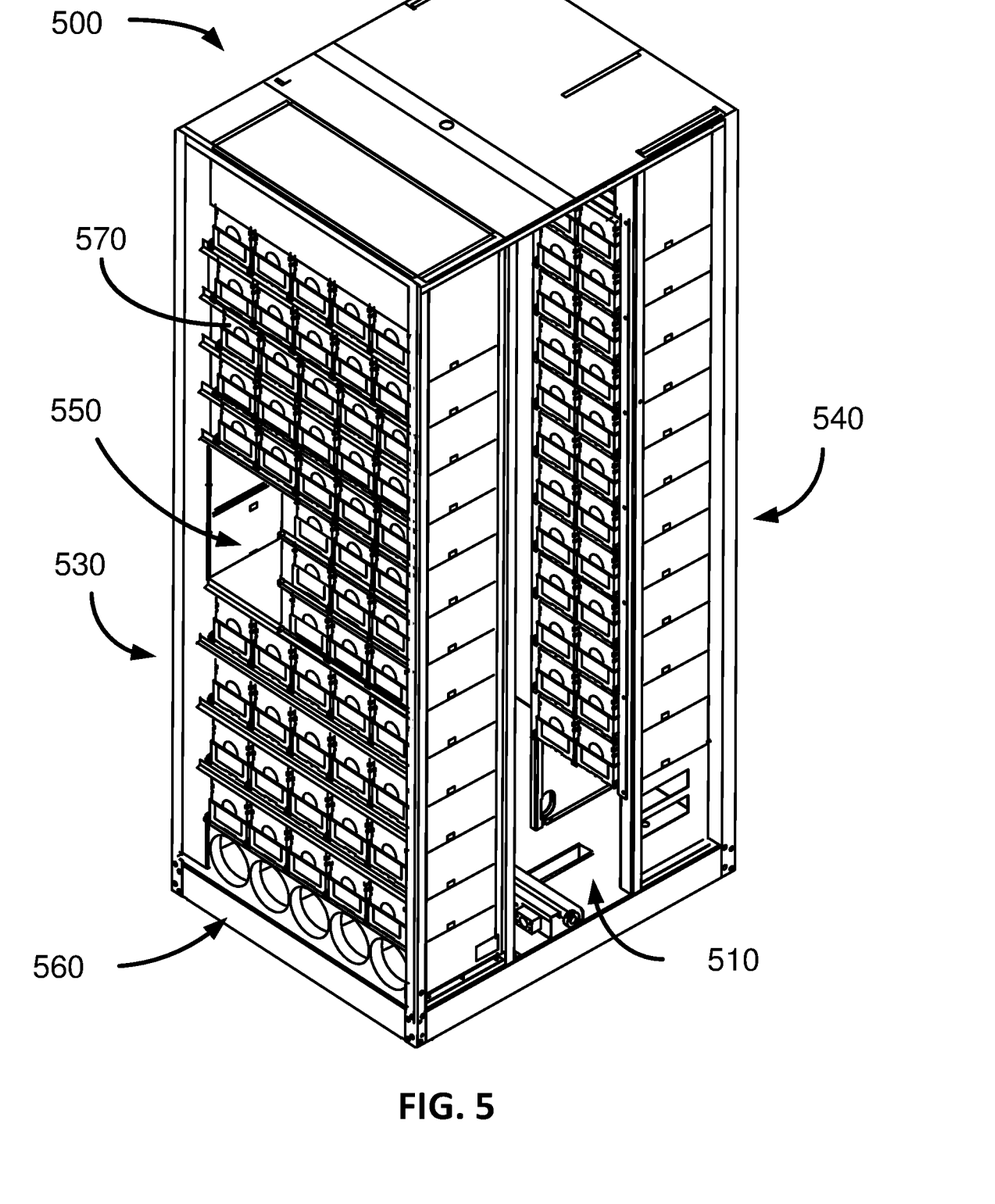
FIG. 5 shows a commercial embodiment of one T-950 library unit without an enclosure consistent with embodiments of the present invention.

Embodiments of the present invention can be commercially practiced in a Spectra Logic T-950 tape cartridge library manufactured by Spectra Logic of Boulder Colo. FIG. 5 shows a commercial embodiment of one T-950 library unit 500 without an enclosure. The T-950 library 500 comprises a first and second shelf system 530 and 540 that are adapted to support a plurality of the mobile media, such as the tape cartridge magazine 570 comprising a plurality of LTO-8 tape cartridges with MAMs, archived by the library 500. The shelf systems 530 and 540 can each comprise at least one auxiliary memory reader, such as the auxiliary memory reader 224 of FIG. 2. Disposed next to the second shelf system 540 are at least four IBM LTO-8 tape drives adapted to write data to and read data from a tape cartridge. The IBM LTO-8 drives each have the capability of storing data to an auxiliary radio frequency memory device 104 contained in an LTO-8 cartridge. Functionally interposed between the first and second shelf system 530 and 540 is a magazine transport space 510. The magazine transport space 510 is adapted to provide adequate space for a tape cartridge magazine 570 to be moved, via a magazine transport and cartridge picker (not shown), from a position in the first shelf system 530, for example, to a tape drive. The magazine transport and picker can further accommodate at least one auxiliary radio frequency memory device reader (not shown). Tape cartridge magazines 570 can be transferred into and out from the T-950 library 500 via an entry/exit port 550. Transferring tape cartridge magazines 570 in and out of the T-950 library 500 can be accomplished by an operator for example. The T-950 library 500 comprises a means for cooling as shown by the fans 560, located at the base of the library 500. The T-950 library 500 can be linked to a central data base, remote server, or cloud authority, such as AWS 210, wherein the AWS KMS 208 can provide storage of all of the data keys that correspond to the encrypted version of the data keys retained in each corresponding auxiliary radio frequency memory devices 104 contained in each corresponding tape cartridge in the T-950 library 500. The T-950 library also comprises a library controller (not shown) that can function as the macro-processor device (CPU) 230 in addition to one or more auxiliary storage devices (not shown), such as a hard disk drive (HDD) or solid state memory drive (SSD). The T-950 library 500 also provides a graphical user interface (not shown) whereon a display of assessment results, simple messages pertaining a user-specified action associated with a tape cartridge, or other information can be displayed, for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the order of the steps does not necessarily require following the sequence as provided in the examples above while staying within the scope and spirit of the present invention. One example includes loading a tape cartridge in a tape drive while or after obtaining both an encrypted key in the data key from the cloud authority. Further, for purposes of illustration, a first and second drive and tape cartridges are used herein to simplify the description for a plurality of tape drives and tape cartridges. Also, the production of the data key by the cloud authority from the encrypted data key is not limited to any of the techniques described herein by way of example. Finally, although the preferred embodiments described herein are directed to tape library systems, such as the tape cartridges 220 and tape drives, and related technology, it will be appreciated by those skilled in the art that the teachings of the present invention can be applied to other systems that can benefit from an RFID tag/memory system (MAM 104) requiring security, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A medium auxiliary memory (MAM) comprising:
   a nonvolatile non-transient solid state memory device;
   an antenna;
   a MAM transceiver;
   a microprocessor; and
   an encrypted data key that uniquely corresponds to a data key obtainable solely from a server that is remote to the MAM, the encrypted data key retained in the nonvolatile non-transient solid state memory device, the data key only capable of being obtained when the encrypted data key is provided to the server and decrypted by the server.

2. The MAM of claim 1 wherein the server is comprised by a cloud system.

3. The MAM of claim 2 wherein the cloud system possesses a hardened key management system that possesses unique information to regenerate the data key.

4. The MAM of claim 1 wherein the MAM is comprised by a tape cartridge that possesses a storage tape medium with encrypted user data retained therein, the encrypted user data can only be decrypted by the data key.

5. The MAM of claim 4 wherein the tape cartridge is disposed in a tape library, the tape library adapted to connect to the server that is remote to the tape library.

6. The MAM of claim 1 wherein the MAM is a passive radio frequency system that is adapted to become inductively energized via the antenna when in an interrogation zone, the MAM transceiver and the microprocessor are adapted to communicate with an external transceiver and transmit the encrypted data key to the external transceiver, the external transceiver linked with a local computing system adapted to provide the encrypted data key to the server, the server adapted to transmit the data key to the local computing system after being provided the encrypted data key.

7. The MAM of claim 1 wherein the encrypted data key is an encrypted version of the data key, the server is configured to generate the encrypted data key by encrypting the data key.

8. The MAM of claim 1 wherein the data key is obtainable solely from the server after the encrypted data key is decrypted into the data key.

9. A method of decrypting user data using a MAM, the method comprising:
   providing a storage element with the MAM physically linked to the storage element, the MAM comprising a non-transient solid state memory device, an antenna, a MAM transceiver, and a microprocessor, the storage element is mobile;
   communicatively linking an external transceiver with the MAM via the antenna, the MAM transceiver and the microprocessor, the external transceiver comprised by a local computing system;
   obtaining via the external transceiver an encrypted data key from the non-transient solid state memory device;
   connecting the local computing system to a remote server;
   sending the encrypted data key to the remote server;

requesting a data key that uniquely corresponds to the encrypted data key, the data key only obtainable from the remote server; and receiving at the local computing system the data key from the remote server after the sending step.

10. The method of claim 9 further comprising forming a cooperating read/write relationship between the storage element and a storage element drive prior to the obtaining step, and decrypting encrypted data retained by the storage element via the data key after the forming step.

11. The method of claim 10 further comprising transmitting the decrypted data to an external user of data that is connected to the local computing system.

12. The method of claim 9 wherein the data storage element is a tape cartridge adapted to form a cooperating read/write relationship with a tape drive.

13. The method of claim 9 wherein the requesting a data key step includes sending unique credential information with the encrypted data key to the remote server.

14. The method of claim 13 wherein the tape drive and the tape cartridge are disposed in a tape library and the tape library is linked to the remote server.

15. The method of claim 9 wherein the remote server is a cloud computing system and the cloud computing system possesses a key management system.

16. The method of claim 9 further comprising decrypting the encrypted data key at the remote server, performing the decrypting step after the sending step, and transmitting the data key from the remote server after the decrypting step and before the receiving step.

17. The method of claim 9 further comprising changing the encrypted data key into the data key by decrypting the encrypted data key at the remote server.

18. A tape cartridge comprising: a medium auxiliary memory (MAM) physically connected to the tape cartridge, the MAM comprising a non-transient memory device, an antenna, a MAM transceiver, a microprocessor and an encrypted data key stored in the non-transient memory device, the tape cartridge comprising a tape recording medium possessing encrypted data, the encrypted data only capable of being decrypted by a data key produced by a remote server, the tape cartridge adapted to be loaded in a tape drive, the encrypted data read from the tape cartridge by the tape drive is adapted to be decrypted by a decryption engine when using the data key, the data key adapted to be provided to the decryption engine only after receiving the encrypted data key from the MAM.

19. The tape cartridge of claim 18 wherein the encrypted data key is adapted to be decrypted at the remote server.

20. The tape cartridge of claim 18 wherein the data key is configured to be encrypted to generate the encrypted data key at the remote server, the encrypted data key is an encrypted version of the data key.

* * * * *